US008543446B2

(12) United States Patent
Richardson et al.

(10) Patent No.: US 8,543,446 B2
(45) Date of Patent: Sep. 24, 2013

(54) METHODS AND APPARATUS TO PREDICT NEW PRODUCT PERFORMANCE METRICS

(75) Inventors: Bruce C. Richardson, Arlington Heights, IL (US); Martin Quinn, Sugar Grove, IL (US); Jeffrey S. Long, Sycamore, IL (US)

(73) Assignee: The Nielsen Company (US), LLC., Schaumburg, IL (US)

( * ) Notice: Subject to any disclaimer, the term of this patent is extended or adjusted under 35 U.S.C. 154(b) by 0 days.

(21) Appl. No.: 13/405,856

(22) Filed: Feb. 27, 2012

(65) Prior Publication Data

US 2012/0296699 A1 Nov. 22, 2012

Related U.S. Application Data

(60) Provisional application No. 61/447,503, filed on Feb. 28, 2011.

(51) Int. Cl.
*G06Q 10/00* (2012.01)
*G06Q 30/00* (2012.01)

(52) U.S. Cl.
USPC .............................. 705/7.31; 705/7.37

(58) Field of Classification Search
USPC ............................... 705/7.11–7.42
See application file for complete search history.

(56) References Cited

U.S. PATENT DOCUMENTS

| 5,446,890 | A | 8/1995 | Renslo et al. |
| 6,611,726 | B1 | 8/2003 | Crosswhite |
| 7,080,026 | B2 | 7/2006 | Singh et al. |
| 7,406,435 | B2 | 7/2008 | Aronowich et al. |
| 7,424,440 | B1 | 9/2008 | Gupta et al. |
| 8,065,203 | B1 * | 11/2011 | Chien et al. ............ 705/28 |
| 8,073,727 | B2 | 12/2011 | Mneimneh et al. |
| 2002/0082902 | A1 * | 6/2002 | Ando et al. ............ 705/10 |
| 2002/0169665 | A1 * | 11/2002 | Hughes et al. ............ 705/14 |
| 2004/0068431 | A1 * | 4/2004 | Smith et al. ............ 705/10 |
| 2007/0078700 | A1 * | 4/2007 | Lenzmann et al. ............ 705/10 |
| 2009/0018996 | A1 * | 1/2009 | Hunt et al. ............ 707/2 |
| 2009/0172024 | A1 | 7/2009 | Hsu et al. |
| 2009/0216611 | A1 * | 8/2009 | Leonard et al. ............ 705/10 |
| 2009/0259509 | A1 * | 10/2009 | Landvater ............ 705/8 |
| 2011/0251875 | A1 | 10/2011 | Cosman |

* cited by examiner

*Primary Examiner* — Lynda Jasmin
*Assistant Examiner* — Sujay Koneru
(74) *Attorney, Agent, or Firm* — Hanley, Flight & Zimmerman, LLC.

(57) ABSTRACT

Methods and apparatus are disclosed to predict new product performance metrics. An example disclosed method includes selecting a product hierarchy tree based on a distribution measure for a new product, identifying a segment location of the product hierarchy tree for the new product, retrieving a relationship matrix associated with the segment location of the product hierarchy tree, the relationship matrix comprising available product performance coefficients and attribute information, identifying a spatial location for the new product in the relationship matrix based on the attribute information, calculating, using a programmed processor, an impact parameter based on the spatial location within the relationship matrix, and calculating the performance metric for the new product based on the impact parameter and a channel sales value.

21 Claims, 10 Drawing Sheets

| Relationship Matrix | Seg. A | Seg. B Apple | Seg. B Grape Size X | Seg. B Grape Size Y | Seg. B Grape Size Z | Seg. B Orange Size X | Seg. C |
|---|---|---|---|---|---|---|---|
| Seg. A | DI | CI | CI | CI | CI | CI | CI |
| Seg. B Apple | CI | DI | CI | CI | CI | CI | CI |
| Seg. B Grape Size X | CI | CI | DI | CI | CI | CI | CI |
| Seg. B Grape Size Y | CI | CI | CI | DI | CI | CI | CI |
| Seg. B Grape Size Z | CI | CI | CI | CI | DI | CI | CI |
| Seg. B Orange Size X | CI | CI | CI | CI | CI | DI | CI |
| Seg. C | CI | CI | CI | CI | CI | CI | DI |

| Relationship Matrix ←104 | Seg. A | Seg. B Apple | Seg. B Grape Size X | Seg. B Grape Size Y | Seg. B Grape Size Z | Seg. B Grape Size W ←604/530 | Seg. B Orange Size X | Seg. C ←102 |
|---|---|---|---|---|---|---|---|---|
| Seg. A | DI | CI | CI | CI | CI | CI | CI | CI |
| Seg. B Apple | CI | DI | CI | CI | CI | CI | CI | CI |
| Seg. B Grape Size X | CI | CI | DI | CI | CI | CI | CI | CI |
| Seg. B Grape Size Y | CI | CI | CI | DI | CI | CI | CI | CI |
| Seg. B Grape Size Z | CI | CI | CI | CI | DI | CI | CI | CI |
| Seg. B Grape Size W ←602 | CI | CI | CI | CI | CI | DI | CI | CI |
| Seg. B Orange Size X | CI | CI | CI | CI | CI | CI | DI | CI |
| Seg. C | CI | CI | CI | CI | CI | CI | CI | DI |

METHODS AND APPARATUS TO PREDICT NEW PRODUCT PERFORMANCE METRICS

RELATED APPLICATION

This patent claims the benefit of U.S. Provisional Patent Application Ser. No. 61/447,503, which was filed on Feb. 28, 2011, and is hereby incorporated herein by reference in its entirety.

FIELD OF THE DISCLOSURE

This disclosure relates generally to market research, and, more particularly, to methods and apparatus to predict new product performance metrics.

BACKGROUND

Retailers or consultants to retailers consider which product(s) to place in an aisle, and determine which competitive or complimentary products should accompany such product(s). In some examples, proximity of a product of interest to a competitive product will cause one of the two products to increase its sales volume at the expense of the other product. This effect is sometimes referred to as cannibalization. In such examples, a retailer or a consultant to retailers may choose to remove certain products from one or more shelves or aisles. In other examples, aggregate volumes of total sales, including the product of interest and one or more competitive products, improve based on the arrangement of the products displayed in the aisle (e.g., displayed on a shelf of the aisle). Thus, the retailer is typically concerned with creating an assortment of products that reduces cross product cannibalization while increasing aggregate sales of products.

DETAILED DESCRIPTION

Methods and apparatus are disclosed to predict new product performance metrics. An example disclosed method includes selecting a product hierarchy tree based on a distribution measure for a new product, identifying a segment location of the product hierarchy tree for the new product, retrieving a relationship matrix associated with the segment location of the product hierarchy tree, the relationship matrix comprising available product performance coefficients and attribute information, identifying a spatial location for the new product in the relationship matrix based on the attribute information, calculating, using a programmed processor, an impact parameter based on the spatial location within the relationship matrix, and calculating the performance metric for the new product based on the impact parameter and a channel sales value.

Attempts to introduce a new product to an existing shelf in an aisle of a retailer may be met with resistance by the retailer based on, in part, a concern that any new product may have an adverse effect on adjacent products on the shelf and, thus, reduce overall sales revenue. For example, consumer goods companies frequently attempt to introduce new products into the market, but must negotiate with retailers to de-list products (preferably of competitors) to make room for the new product(s). Absent reliable data and/or predictions of performance for the new product, the retailer may be unwilling to accept a new product. The success or failure of decisions of which products) to adjust shelf allocation, such as de-listing and/or shelf space adjustment(s), translate into improved or diminished sales profits and/or revenue performance for the retailer in general. Unfortunately, in the event the decision to de-list a product or adjust a shelf allocation result in poor sales for the new product or one or more adjacent products, the diminished aggregate sales may remain for an extended time period. Thus, it is important to accurately predict the success or failure of new product(s) and the impact such new product(s) will have on other product(s).

Example systems, methods, apparatus and/or articles of manufacture disclosed herein may be used to predict the performance of a new product that has not yet been available in a consumer market. At least one benefit of example systems, methods, apparatus and/or articles of manufacture disclosed herein is an opportunity to predict new product performance before deciding which other product(s) to modify (e.g., de-list, modify shelf allocation, etc.), thereby avoiding the overall diminished sales profits and/or revenue effects of a poor modification decision. Although identifying different product assortments to reduce cannibalization and ensure aggregate sales, profits and/or revenue is possible for existing products based on, in part, analysis of historical sales data, new products do not have such historical sales data to facilitate forecasting efforts.

Example systems, methods, apparatus and/or articles of manufacture disclosed herein forecast a performance metric of products to be displayed in a store. The forecast may be affected by, in part, how much of the product will be available in the market and/or how much of the product will be available in a particular channel of the market (e.g., a grocery store channel, a convenience store channel, a gas station channel, etc.). Generally speaking, a measure of how much of the product is available in a market channel is referred to as a "distribution measure" of the product. For example, a product associated with the dental products category may be offered for consumer purchase at grocery store and pharmacy channels. A distribution measure of 50% indicates that only half of the channels expected to carry the product of interest in the dental products category will actually make that dental product available to consumers. On the other hand, a distribution measure of 100% indicates that the product of interest is available in all of the expected channels.

Measures of distribution vary from one geography to another based on, in part, the types of retailers present in the geography, the types of products historically sold in the geography, cultural effects, etc. For example, a category related to barbecue condiments may exhibit greater distribution in Southern geographies of the United States when compared to Northern geographies. Additionally, for a given distribution measure of a geography, the presence of specialty retailers (e.g., barbecue supply stores, boutique cooking supply stores, office supply stores, etc.) may affect sourcing of products within the category of interest. Differences in geographic distribution may also cause differences in the manner in which products affect each other on a display shelf in terms of proportional volume shifting. In some examples, the addition of a competitive product shifts volume away from the other products adjacent to the competitive product in a manner that can be characterized empirically. Empirical observations over time are cultivated by example methods, systems, apparatus and/or articles of manufacture disclosed herein to allow differential weights (impact parameters) to be derived between products of one or more categories and/or specific to one or more channels. The empirical observations are aggregated to derive the differential weights and generate one or more relationship matrices.

Figure 1:
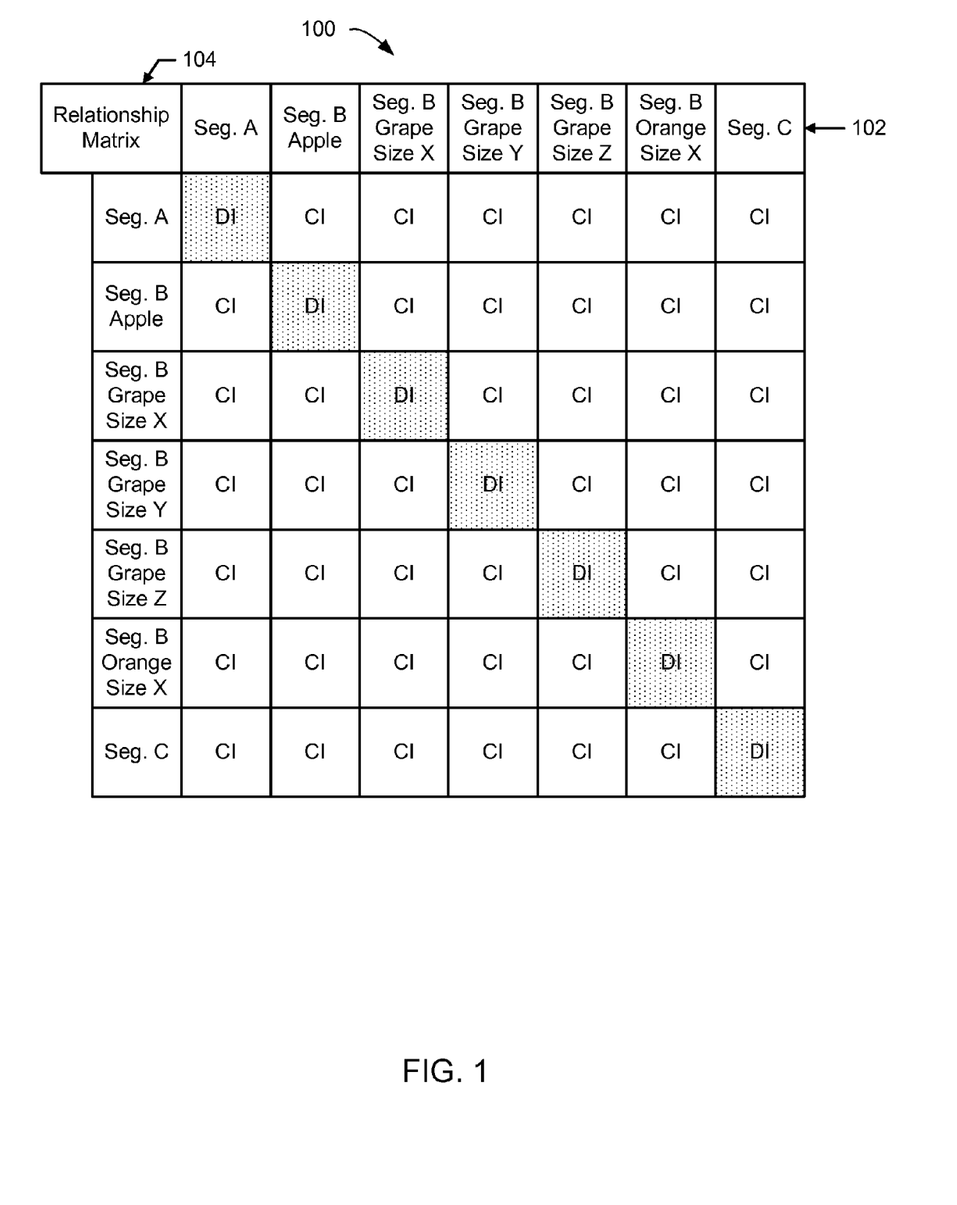
FIG. 1 is a relationship matrix representative of example product relationships to be used by the system of FIG. 3.

In the illustrated example of FIG. 1, a relationship matrix 100 includes a row of available products 102 and a column having the same available products 104. Each cell within the example relationship matrix 100 includes data derived from empirical observations indicative of the effect a product in the row 102 has on a product in the column 104. Products along the diagonal of the example relationship matrix 100 reflect a direct impact ("DI"), which is the impact of the product on itself. Products not along the diagonal reflect a cross impact ("CI"), which include performance coefficients and product attributes at the product level to allow one or more calculations of the effect on one product to another product when placed on a retail shelf. To identify an effect that changing an assortment of products may have on sales, the product pairs may be selected at different rows/columns to calculate impact parameters from the intersecting cell coefficient value(s).

The example relationship matrix 100 of FIG. 1 may be one of many relationship matrices employed by example systems, methods, apparatus and/or articles of manufacture disclosed herein when forecasting the effects of changing product assortment option(s) and/or delisting product(s). For example, a relationship matrix may be tailored to include geographic attributes that reflect interaction behavior for particular geographic regions within a market and/or sub-market. Changing geographic regions exhibit different impacts from one product to another product, different impacts from one product to a category of products, different proportions of sales, etc. As such, the relationship matrix illustrates how products give and/or take away volume when introduced on a retail shelf in a given geographic market, which may be further influenced by the geographic attributes, such as, but not limited to distribution measures, product attributes, channel placement, etc.

Figure 2:
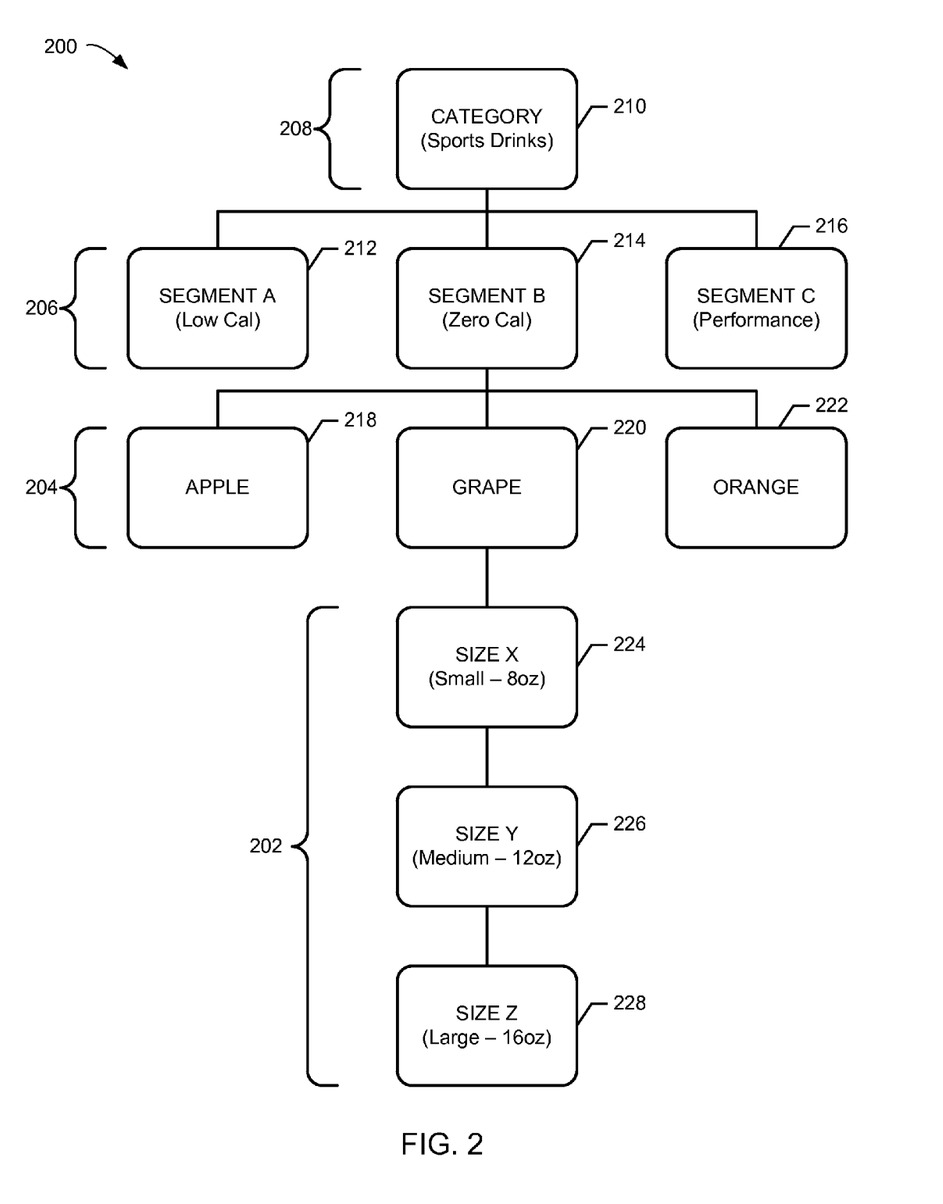
FIG. 2 is a tree diagram representative of example hierarchical relationships within a product category.

Prior to developing one or more relationship matrices, such as the example relationship matrix 100 of FIG. 1, example systems, methods, apparatus and/or articles of manufacture disclosed herein develop one or more attribute trees to visualize a hierarchy of products (sometimes referred to as a "hierarchy tree"). In the illustrated example of FIG. 2, the example attribute tree 200 includes any number of products at a first level detail (i.e., most granular level) 202. In the example of FIG. 2, levels of detail below the highest level include nodes (segments) having a greater degree of detail, and the lowest level of an attribute tree typically contains specific products. An example second level detail 204 includes all of the products or other items below it, and may have one or more adjacent types of second level detail. In the illustrated example of FIG. 2, flavors are a second level detail 204. An example third level detail 206 is an abstraction of the level beneath it (i.e., the second level detail 204), and an example fourth level detail 208 represents a highest abstraction of the example attribute tree 200, such as a category. Although the illustrated example of FIG. 2 includes four levels of detail, other numbers of levels may alternatively be employed. The example levels of detail of FIG. 2 are described herein for purposes of explanation and not limitation.

Without limitation, the example attribute tree 200 may be stored in a database or memory and accessed by the analyst via a graphical user interface to explore and/or examine any level of attribute detail in the hierarchy. The example fourth level detail 208 of FIG. 2 represents a category of sports drinks 210, which may further be described and/or otherwise considered by the example systems, methods, apparatus and/or articles of manufacture disclosed herein to have sub-categories. In the illustrated example of FIG. 2, the third level of detail 206 identifies additional granularity of the level above it, such as type of sports drinks 210 (e.g., low calorie 212, zero calorie 214, or performance 216). After selecting one or more levels of detail from the example attribute tree 200 (e.g., via a user interface, a graphical user interface (GUI), etc.), associated information may be visualized that is related to the preceding level. In the illustrated example of FIG. 2, the example zero calorie 214 attribute in the third level of detail 206 includes three sub-attributes in the second level detail 204; apple flavor 218, grape flavor 220 and orange flavor 222. Additionally, after selecting and/or otherwise navigating to one or more attributes in the example second level of detail 204, corresponding sub-attributes are displayed and/or otherwise revealed in the example attribute tree 200 such as size X 224, size Y 226 and size Z 228. Each attribute tree, such as the example attribute tree 200 of FIG. 2, may be associated with a corresponding relationship matrix, such as the example relationship matrix 100 of FIG. 1.

Additionally, a unique attribute tree may be associated with each geographic region of interest to reflect particular regional influences of one product in view of other products. For example, a first geographic region may include low calorie sports drinks 212, zero calorie sports drinks 214 and performance sports drinks 216, while a second geographic region may not sell and/or otherwise make available the zero calorie sports drinks 214. In such examples, the interaction between low calorie sports drinks 212 and performance sports drinks 216 is different in the first geographic region as compared to the second geographic region. In still other examples, because the second geographic region includes only two types of sports drinks (i.e., low calorie 212 and performance 216), a relatively greater degree of product sourcing and/or influence may occur therebetween than compared to the first geographic region, which includes a greater degree of distribution variety. Generally speaking, the attribute tree 200 allows the analyst to appreciate how products may be physically related, and maps each product of interest to a corresponding hierarchy of attributes.

While the example attribute tree 200 of FIG. 2 and the example relationship matrix 100 of FIG. 1 allows the analyst to appreciate the effects of placing competitive products on a shelf, the analyst is not able to identify such effects with respect to new products that do not have a corresponding sales history. Example methods, apparatus and/or articles of manufacture disclosed herein may be used to tailor the relationship matrix in a manner that adds the new product of interest and identifies effect(s) of introducing such a product (with or without disturbing other product(s)). Some such examples derive impact parameters associated with the introduction of the new product by leveraging impact parameters and/or coefficients of rows and columns of the relationship matrix against the new row and/or column added for the new product. The derivation of these impact parameters further enable calculations to reveal the impact of introducing the new product on: (1) sales allocated to a geography of interest, (2) distribution in the geography, and/or (3) shelf space in the geography.

Figure 3:
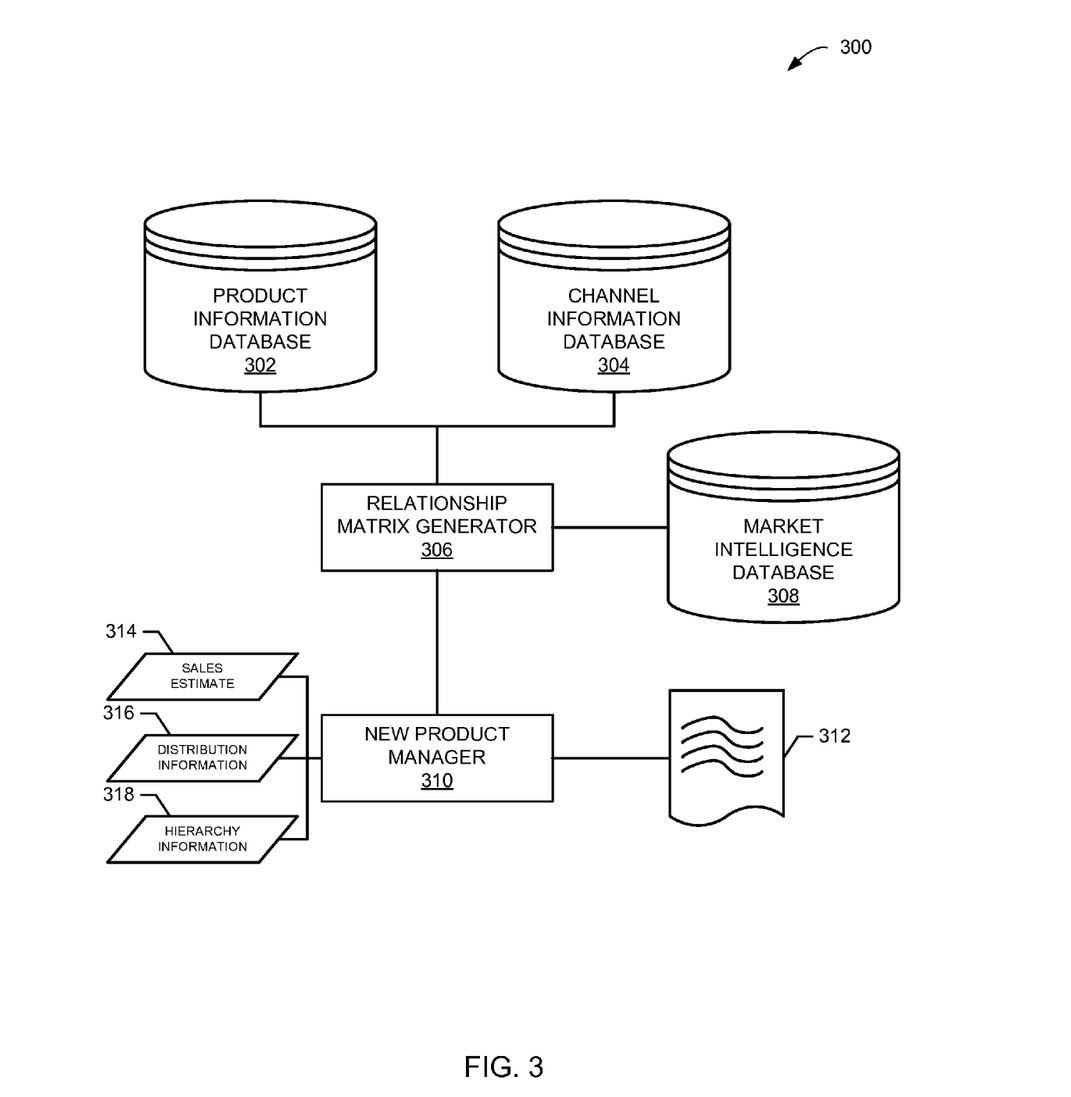
FIG. 3 is a schematic illustration of an example system to predict new product performance metrics.

FIG. 3 is a schematic illustration of a system 300 to predict one or more new product performance metrics. As used herein, "product performance metrics" include, but are not limited to, sales (e.g., volume, profit, revenue and/or other sales measures) allocated to a geography, distribution effects in the geography, a measure of shelf space occupied by the new product in the geography, and/or market forecasting of the effect(s) the new product has on other products. In the illustrated example of FIG. 3, the system 300 includes a product information database 302, a channel information database 304, and a relationship matrix generator 306. In operation, the example relationship matrix generator 306 generates one or more relationship matrices based on information from the product information database 302 and/or the channel information database 304. The example product information database 302 of FIG. 3 includes product specific attribute information such as, but not limited to product name, manufacturer name, brand, packaging type, product size, flavor, lot number, serial number, nutritional information and/or a corresponding universal product code (UPC). The Nielsen® Product Reference Library (PRL) that codes more than 700,000 items, in which each item includes an average of forty (40) descriptive characteristics, is an example source for such product information.

The example product information database 302 of FIG. 3 also includes historical point of sale (POS) information for the products in the PRL. POS information may be obtained in any manner including, but not limited to panelist based consumer monitoring, such as the Nielsen® Homescan® system, and/or POS UPC scanning equipment at retailer locations, such as the Nielsen® Scantrack® system. Information related to one or more channels in the example channel information database 304 may be obtained in any manner including, but not limited to the Nielsen® TDLinx® system, which tracks and stores information related to retailer stores, parent company information, parent company marketing group(s), a number of store(s) in operation, a number of employees per store, an address of the store, and/or the channel(s) serviced by the store(s) (e.g., a grocery channel, a pharmacy channel, etc.).

The example relationship matrix generator 306 of FIG. 3 uses the information indicative of product attributes, sales, and/or geographic channel activity to generate one or more relationship matrices, such as the example matrix 100 of FIG. 1. The matrices and/or associated attribute tree(s) may be stored in a memory for later retrieval and use, such as in a market intelligence database 308.

Although a new product (which, by definition, has not yet been released to the relevant marketplace of interest) does not have associated sales activity data in one or more geograph(ies) and/or channel(s) of interest, an example new product manager 310 receives information related to the new product and modifies one or more relationship matrices to leverage impact parameters of adjacent products (e.g., sibling products). Using the impact parameters from the adjacent products, the example new product manager 310 generates one or more product metrics 312 related to sales allocated to a geography of interest, distribution effects in the geography of interest, and/or a measure of shelf space in the geography of interest. The information related to the new product received by the example new product manager 310 includes, but is not limited to, sales estimates 314, distribution information 316 and/or hierarchy information 318.

Figure 4:
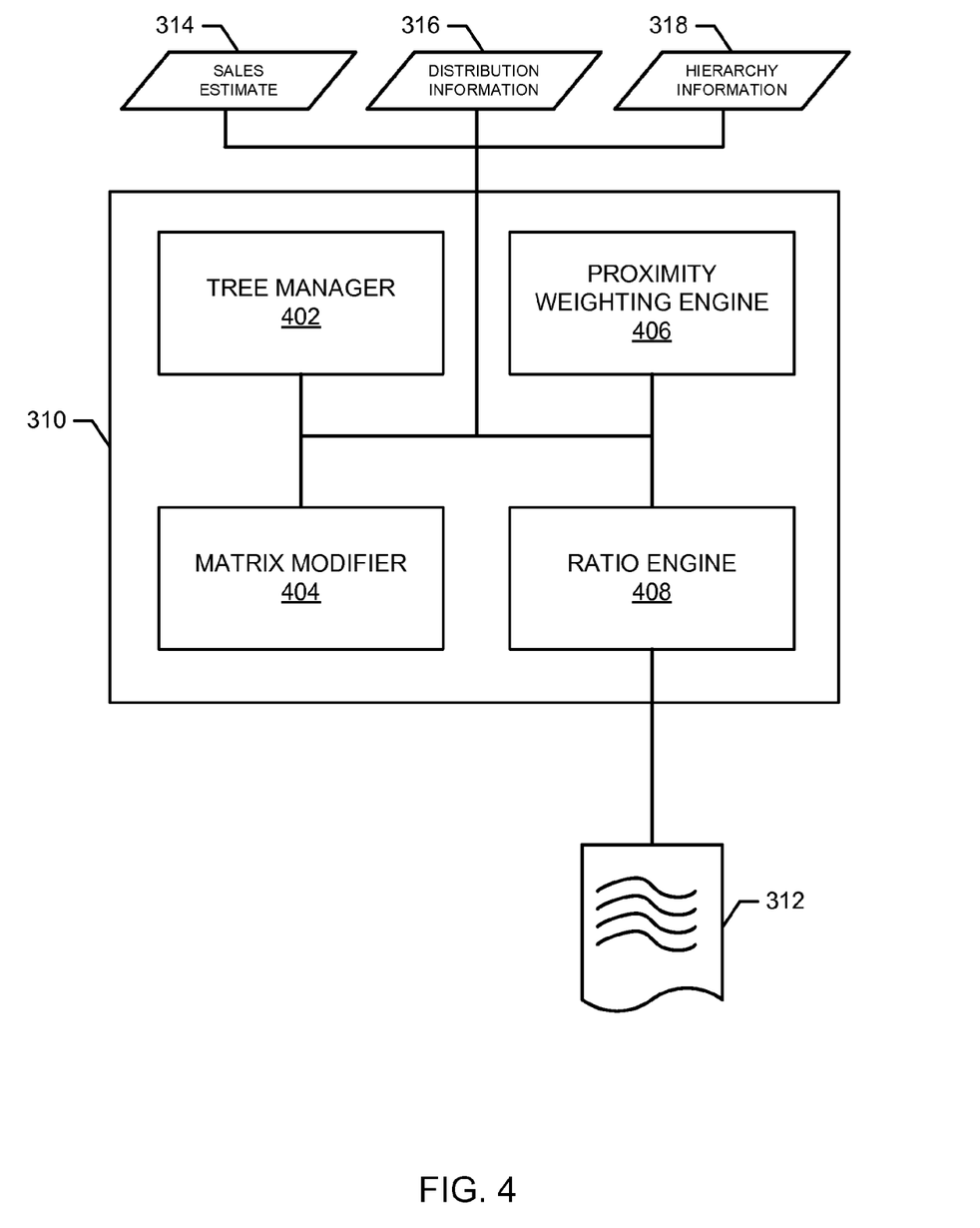
FIG. 4 is a schematic illustration of an example new product manager of the example system of FIG. 3.
Figure 5:
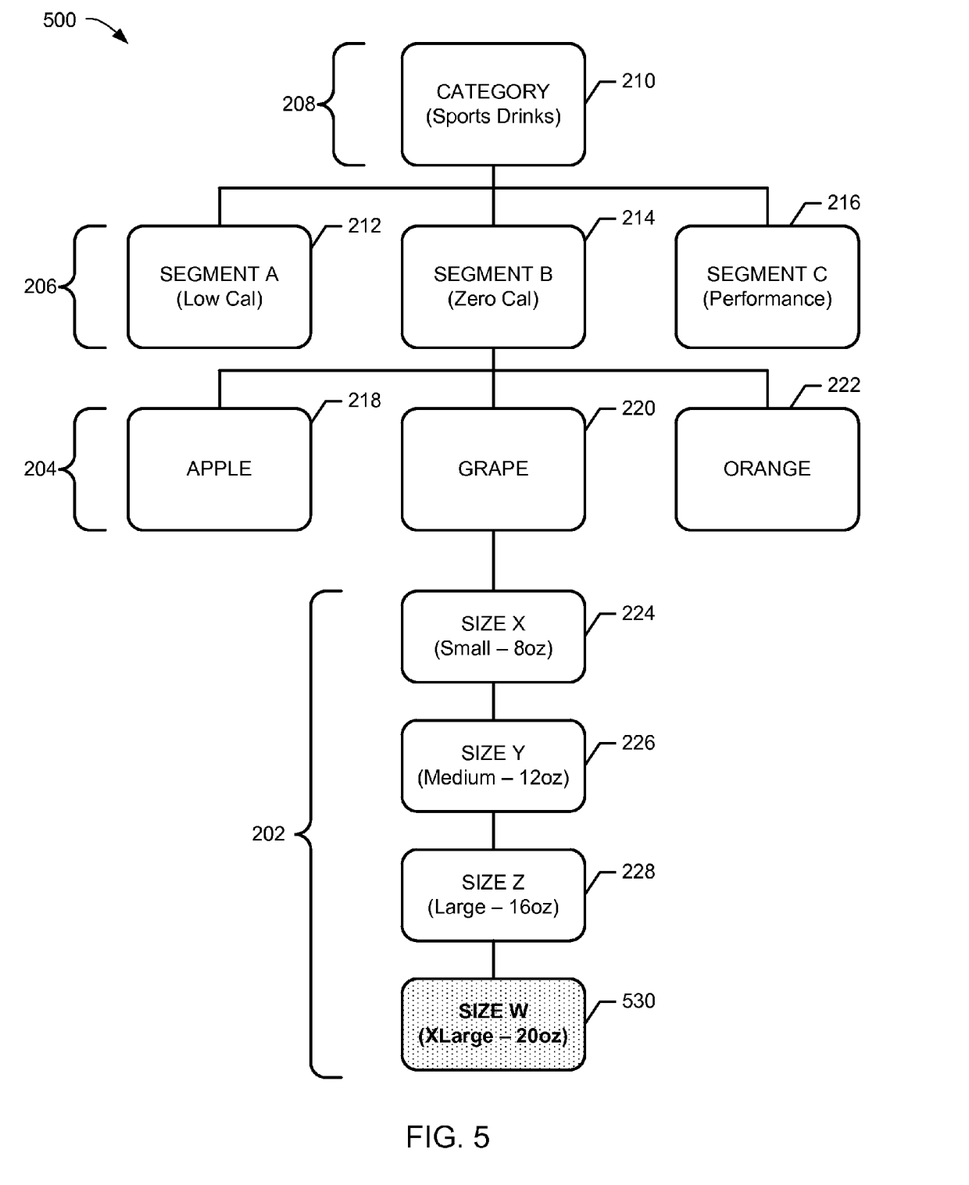
FIG. 5 is an example modified tree diagram generated by the example system of FIG. 3 that includes a new product

FIG. 4 is a schematic illustration of an example implementation of the new product manager 310 of FIG. 3. In the illustrated example of FIG. 4, the new product manager 310 includes a tree manager 402, a matrix modifier 404, a proximity weighting engine 406, and a ratio engine 408. In operation, the example tree manager 402 receives the distribution information and the hierarchy information to generate a modified attribute tree that includes the new product. For example, considering the example attribute tree 200 of FIG. 2 and a new product related to a zero calorie sports drink having a grape flavor and an extra large size of 20 ounces, the tree manager 402 identifies a spatial placement of the new product within the hierarchy of the already existing attribute tree 200. Turning to FIG. 5, a modified attribute tree 500 is shown that is substantially similar to the attribute tree 200 shown in FIG. 2. Based on the distribution information and hierarchy information, the tree manager 402 places the new product at a branch 530 (segment) of the tree 500. In some examples, a manufacturer of the new product will identify a proper location (e.g., hierarchy information 318) for the new product based on their understanding of appropriate similar products, channels and/or attributes. In other examples, the example tree manager 402 may determine that, based on, for example, geographical distribution information 316, the new product should be placed at an alternate location within the tree 500 because of, for example, expected channel influences within the geography.

Returning to FIG. 4, the example matrix modifier 404 tailors an existing relationship matrix, such as the example relationship matrix 100 of FIG. 1, to incorporate a new product row and a new product column based on the modifications to the example tree 500, the distribution information 316 and/or the hierarchy information 318. As described above, a relationship matrix includes information indicative of historical sales activity related to existing products in the market. Additionally, the cells of the relationship matrix may include product attribute information and coefficient values that facilitate calculation of impact parameters between existing products. However, prior to using one or more coefficient values to calculate impact parameters, the example matrix modifier 404 of FIG. 4 inserts a new product row and a new product column into the relationship matrix in a manner that conforms to the distribution information 316 and/or hierarchy information 318 for the new product of interest.

Continuing with the sports drink example, the matrix modifier 404 enters the new sports drink in a column and row adjacent to a sports drink from competitor "A" because, in the geographic region identified by the distribution information 316, competitor "A" has a substantial presence. In some examples, the substantial presence may be based on a threshold value, such as a threshold percentage value of one or more products in a geographic region of interest (e.g., a 50% distribution, a 75% distribution, etc.). On the other hand, one or more additional and/or alternate relationship matrices may be generated by the matrix modifier 404 based on available competitors in the alternate geographies. As described above, knowledge of the available competitors in a geographic region of interest may reveal which existing products will be sourced by the new product(s). For example, the matrix modifier 404 may enter the new sports drink in a column and row adjacent to a sports drink from competitor "B" because, in the other geographic region identified by the distribution information 316, competitor "B" has a threshold presence. In still other examples, the matrix modifier 404 may enter the new sports drink in a column and row adjacent to multiple sports drinks from both competitors "A" and "B" in the event that both have a substantial presence and/or observed sales volume in the other geography. While the above examples refer to geographic factors and/or geographical distribution information, example methods and apparatus disclosed herein are not limited thereto. One or more alternate and/or additional factors may be employed with the example matrix modifier 404, such as, but not limited to one or more product characteristics (size, packaging, color, shape, etc.), similar items in distribution, shelf characteristics, volumetric space characteristics (e.g., shelf dimensions), etc.

Figure 6:
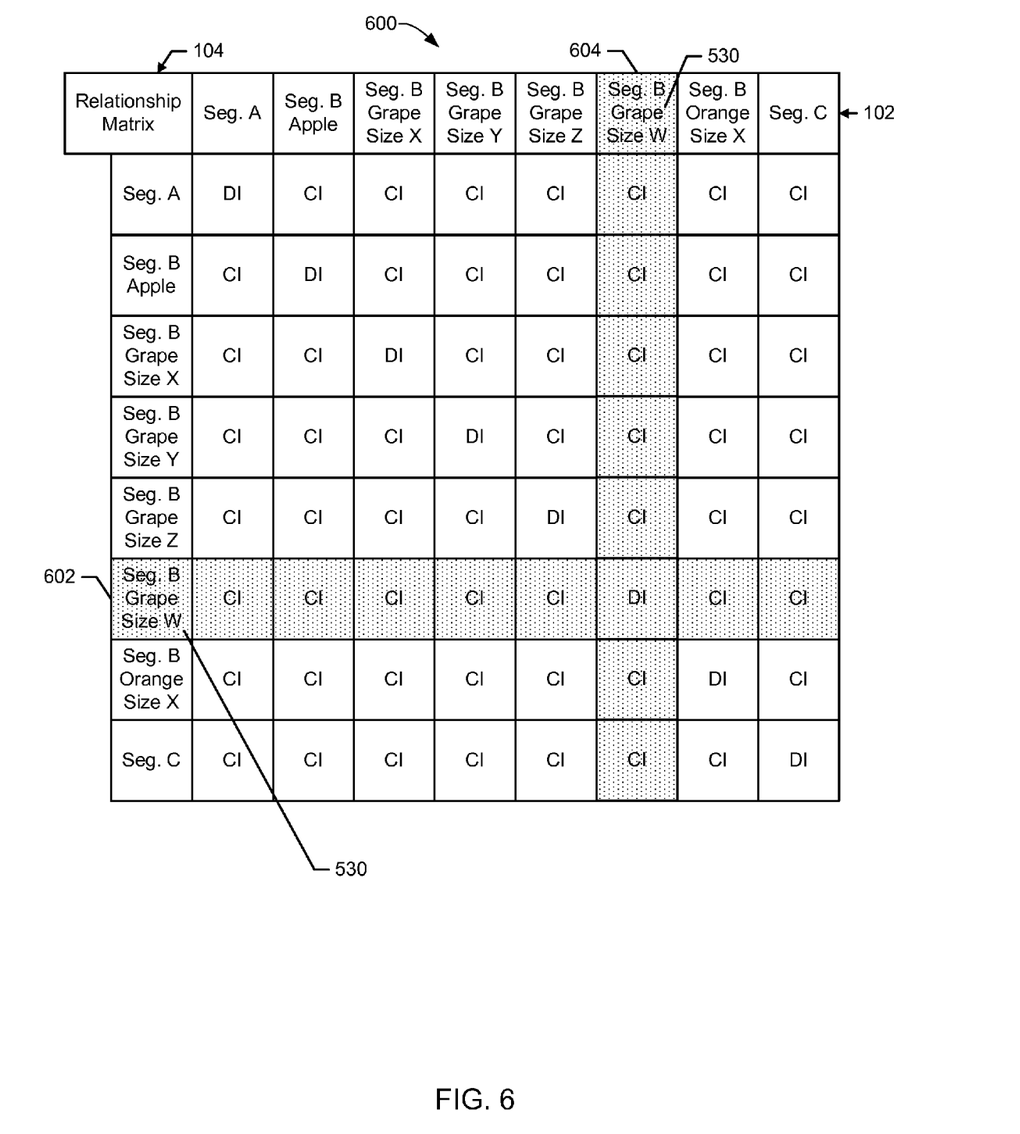
FIG. 6 is an example modified attribute matrix generated by the example system of FIG. 3 that includes a new product.

Turning briefly to FIG. 6, an example modified relationship matrix 600 is shown that is substantially similar to the example relationship matrix 100 of FIG. 1. As described above, the received hierarchy information 318 and/or modifications to the example attribute tree 200 assist in identifying where a new product row and column should be placed. In the illustrated example of FIG. 6, the new zero calorie grape flavored sports drink of size W 530 is inserted into the modified relationship matrix 600 at row 602 and column 604. While row 602 and column 604 represent the same newly added product (e.g., zero calorie grape flavored sports drink of size W), the intersecting values between the row(s) and column(s) may be different. In this example, the example matrix modifier 404 identified neighboring products deemed most similar to the new zero calorie grape flavored sports drink of size W 530 based on, in part, the received hierarchy information 318, which depending on, in part, geography information (what types of stores, what they keep on shelves, etc.) and the received distribution information 316. While the illustrated example of FIG. 6 shows a single modified relationship matrix 600, the matrix modifier 404 may generate any number of modified relationship matrices tailored for one or more market geographies identified by the distribution information 316. As described above, each relationship matrix may include information indicative of geographic characteristic(s) related to the marketing channel, distribution, and/or product attribute(s) (e.g., an amount of linear units of space consumed by the product on a shelf). For example, in a first market geography, the new product 530 is placed in a new row and column adjacent to a first set of competitive products because, in part, that first set of competitive products has a presence (e.g., 85% distribution in the first market geography) in the first market geography. However, that same modified relationship matrix may not be appropriate for a second market geography due to, in part, differing competitive players in that second geography.

The example proximity weighting engine 406 of FIG. 4 populates the new cells in the modified relationship matrix 600 of the newly added row 602 and column 604 that are associated with the new product. Coefficients from cells associated with existing products that surround the cells associated with the new row 602 and column 604 may be used to generate new coefficients for the new cells (shown shaded in FIG. 6). The new coefficients may be generated by the proximity weighting engine 406 in any manner including, but not limited to, averaging, curve fitting and/or geometric weighting techniques. In other examples, the new coefficients are the result of a weighted mathematical average of sibling matrix cells. Additionally, the example proximity weighting engine 406 creates impact parameters from one or more cell coefficient value(s) in view of one or more comparisons between the new product and adjacent competitive product(s). The values in the new cells may be calculated based on immediately adjacent cells and/or on cells spaced from the new cells by one or more intervening cells. The new cell coefficient values in the cells associated with the new product of interest may be used to calculate product level performance metrics of the new products by using an assortment optimization model, such as the Assortman Optimizer® by Nielsen®.

The example ratio engine 408 of FIG. 4 employs the modified attribute tree, such as the example modified attribute tree of FIG. 5, and sales estimates for a channel of interest, such as the sales estimates 314, to calculate sales allocated to a geography of interest, a distribution effect in the geography of interest, and/or a measure of shelf space in that geography. In other examples, the ratio engine 408 employs information from the attribute tree to calculate sales allocated to the geography of interest, and the modified relationship matrix may be further employed to calculate specific volumetric effects of introducing the new product to the market on other products (e.g., sibling products). The concept of aiding or hampering sales volume of an existing product by introducing a new product is sometimes referred to as "cannibalization."

Using the sales estimate information 314, which is an estimated sales value for a channel of the new product, category sales in a target geography, and/or channel sales in the target geography, the example ratio engine calculates estimated sales of the new product in the target geography. In other words, if a sales estimate is 10,000 units in a grocery store channel at a 50% distribution, then the example ratio engine 408 facilitates calculating how much of those 10,000 units will sell in the geography of interest. A ratio of the category sales within the target geography over the overall category sales within the channel of interest is calculated and referred to herein as a "category ratio." A category is a type of product (e.g., sports drinks, board games, etc.). Additionally, a ratio of channel sales in the target geography over the overall channel sales is calculated and referred to herein as a "channel ratio." A channel is a category of distribution (e.g., retail stores, grocery stores, hardware stores, etc.). Furthermore, because some new products will exhibit different influences on category and channel sales due to the nature of the product, the popularity of the product, regional preferences for the product, and/or the popularity of the brand, impact parameters are applied to the channel ratio and the category ratio based on how the new product fits within the category. In some examples, information regarding how the new product fits within the category is obtained from attribute tree information, such as the example attribute tree 500 of FIG. 5.

Generally speaking, when determining an impact parameter (weight) the proximity weighting engine 406 may consider whether category activity for the new product is believed to be more influential than channel activity. For example, pizza sales are not likely to have distinguishing channel activity differences from one geographic market to another. In most geographical markets, as evidenced by the historical POS data from the product information database 302 and/or the channel information database 304, pizza sales are substantially homogeneous. However, as more detailed levels of granularity in the example attribute tree for the pizza category are propagated (e.g., advancing from a high level tree category toward a lower level of the tree having greater granularity and/or product specificity), geographic (regional) differences become more apparent. For example, a sub-category of pizza may include pan pizza versus thin-crust pizza. In the event that the new product is related to pan pizza and a target geography of interest is Chicago, then channel activity is likely to be an influential component of sales allocated to the geography of interest. On the other hand, if a second geography of interest includes Seattle, the channel activity may also be an influential component of sales based on an observed preference for thin-crust pizza in the Northwest United States.

An example manner of calculating sales allocated to a geography of interest is shown in Equation 1.

$$V(g) = \frac{SalesEstimate}{\alpha_1}\left[\frac{A}{B} + \alpha_2 \frac{C}{D}\right].\quad\text{Equation 1}$$

In the illustrated example of Equation 1, which may be implemented by the example ratio engine 408, V(g) represents the volume sales of the new product allocated to the target geography (g), SalesEstimate represents an estimated number of new products to be sold in the target geography of a particular channel (e.g., 10,000 units), such as the example sales estimate 314 of FIG. 3, $\alpha_1$ and $\alpha_2$ represent first and second impact parameters, the ratio A/B represents the category ratio, and the ratio C/D represents the channel ratio. In particular, A represents category sales in the target geography (g), B represents overall category sales in the channel. The value of A and B may be obtained from the product information database 302 and/or the channel information database 304. C represents channel sales in the target geography, and D represents overall channel sales. As described above, because one or more modified relationship matrices, such as the example modified relationship matrix 600 of FIG. 6, are tailored by the example matrix modifier 404 to geographic market characteristics, the resulting sales allocated to the target geography for the new product of interest and sibling product(s) may be calculated in the geography of interest based on the coefficients in the new row and column. Additionally, one or more forecasts may be generated in view of scenarios where distribution factors are changed to view corresponding effects on products within the relationship matrices.

A measure of the allocation or spread of items (distribution) over one or more geographies of interest may also be calculated by the example ratio engine 408 to facilitate comparison of items in the target geography to items in the channel geography. An example manner of calculating the measure of the distribution over a geography of interest is shown in Equation 2.

$$D(g) = \frac{Dist}{\alpha_1}\left[\frac{A}{B} + \alpha_2 \frac{C}{D}\right].\quad\text{Equation 2}$$

In the illustrated example of Equation 2, D(g) represents the items allocated to geography (g), Dist represents an estimated distribution for the new products for the target geography, such as the example distribution information 316 of FIG. 3, $\alpha_1$ and $\alpha_2$ represent first and second impact parameters, the ratio A/B represents the category ratio, and the ratio C/D represents the channel ratio. In particular, A represents category distribution in the target geography (g), B represents overall category distribution in the channel. The values of A and B may be obtained from the product information database 302 and/or the channel information database 304. C represents channel distribution in the target geography. D represents overall channel distribution.

While an example manner of implementing an example system 300 to predict new product performance metrics has been illustrated in FIGS. 3 and 4, one or more of the elements, processes and/or devices illustrated in FIGS. 3 and 4 may be combined, divided, re-arranged, omitted, eliminated and/or implemented in any other way. Further, the example product information database 302, the example channel information database 304, the example relationship matrix generator 306, the example market intelligence database 308, the example new product manager 310, the example tree manager 402, the example matrix modifier 404, the example proximity weighting engine 406 and/or the example ratio engine 408 of FIGS. 3 and 4 may be implemented by hardware, software, firmware and/or any combination of hardware, software and/or firmware. Thus, for example, any of the example product information database 302, the example channel information database 304, the example relationship matrix generator 306, the example market intelligence database 308, the example new product manager 310, the example tree manager 402, the example matrix modifier 404, the example proximity weighting engine 406 and/or the example ratio engine 408 of FIGS. 3 and 4 could be implemented by one or more circuit(s), programmable processsor(s), application specific integrated circuits) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example product information database 302, the example channel information database 304, the example relationship matrix generator 306, the example market intelligence database 308, the example new product manager 310, the example tree manager 402, the example matrix modifier 404, the example proximity weighting engine 406 and/or the example ratio engine 408 of FIGS. 3 and 4 are hereby expressly defined to include a tangible computer readable medium such as a memory, DVD, CD, Blu-ray, etc. storing the software and/or firmware. Further still, the example system 300 of FIG. 3 may include one or more elements, processes and/or devices in addition to, or instead of, those illustrated in FIGS. 3 and 4, and/or may include more than one of any or all of the illustrated elements, processes and devices.

Figure 7:
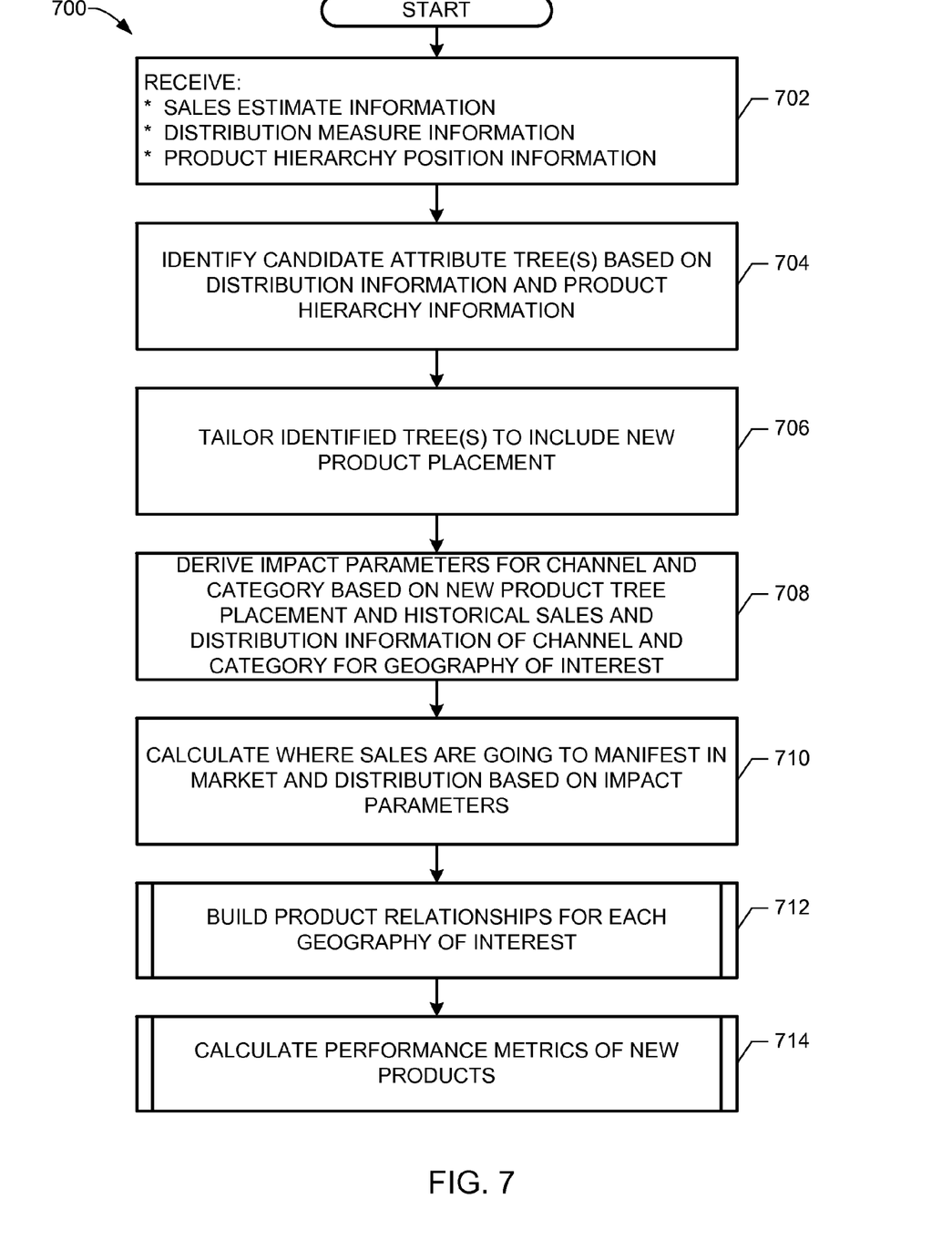
FIGS. 7-9 are flowcharts representative of example machine readable instructions that may be executed to implement the example system shown in FIGS. 3 and 4.
Figure 8:
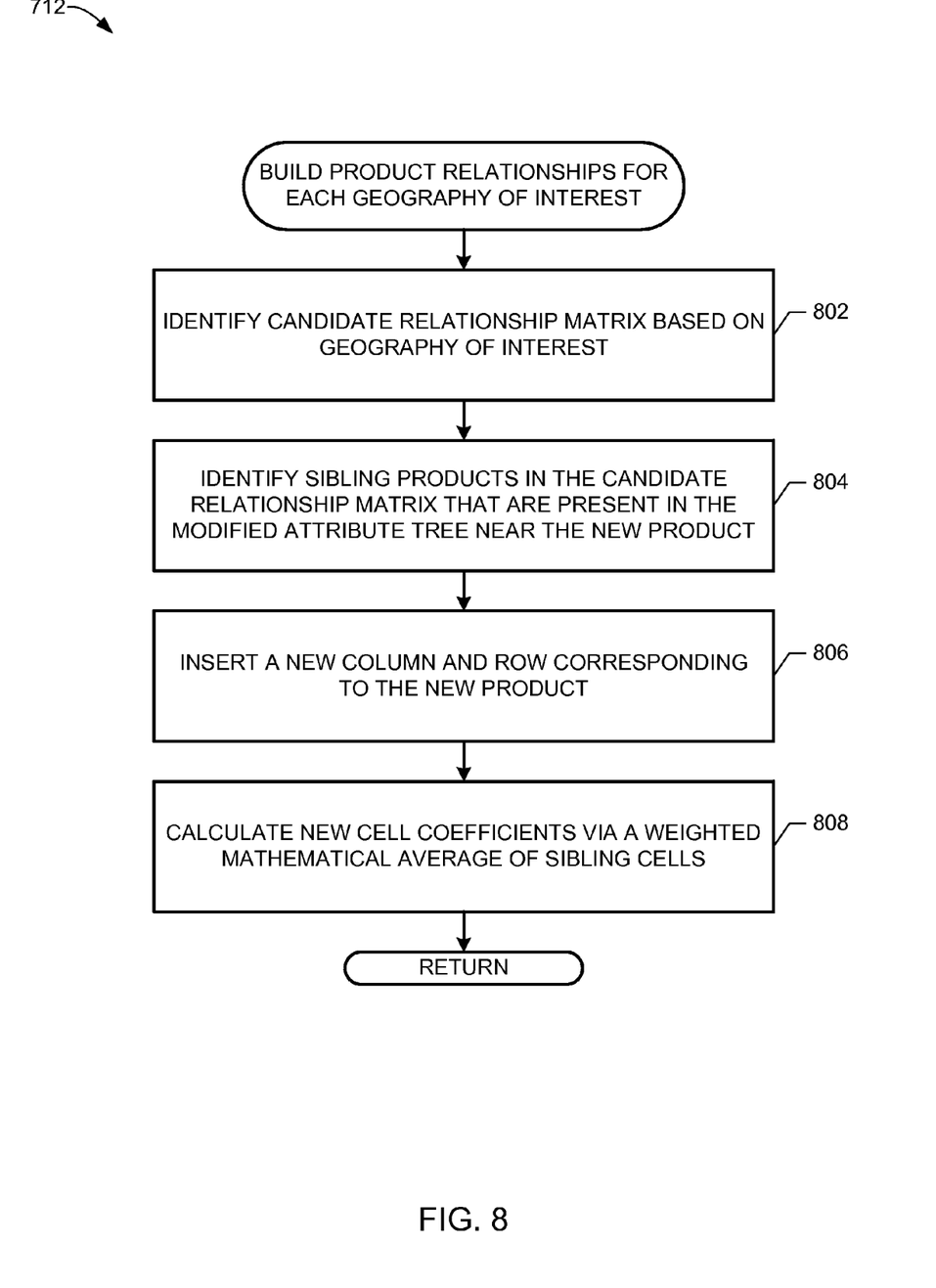
Figure 9:
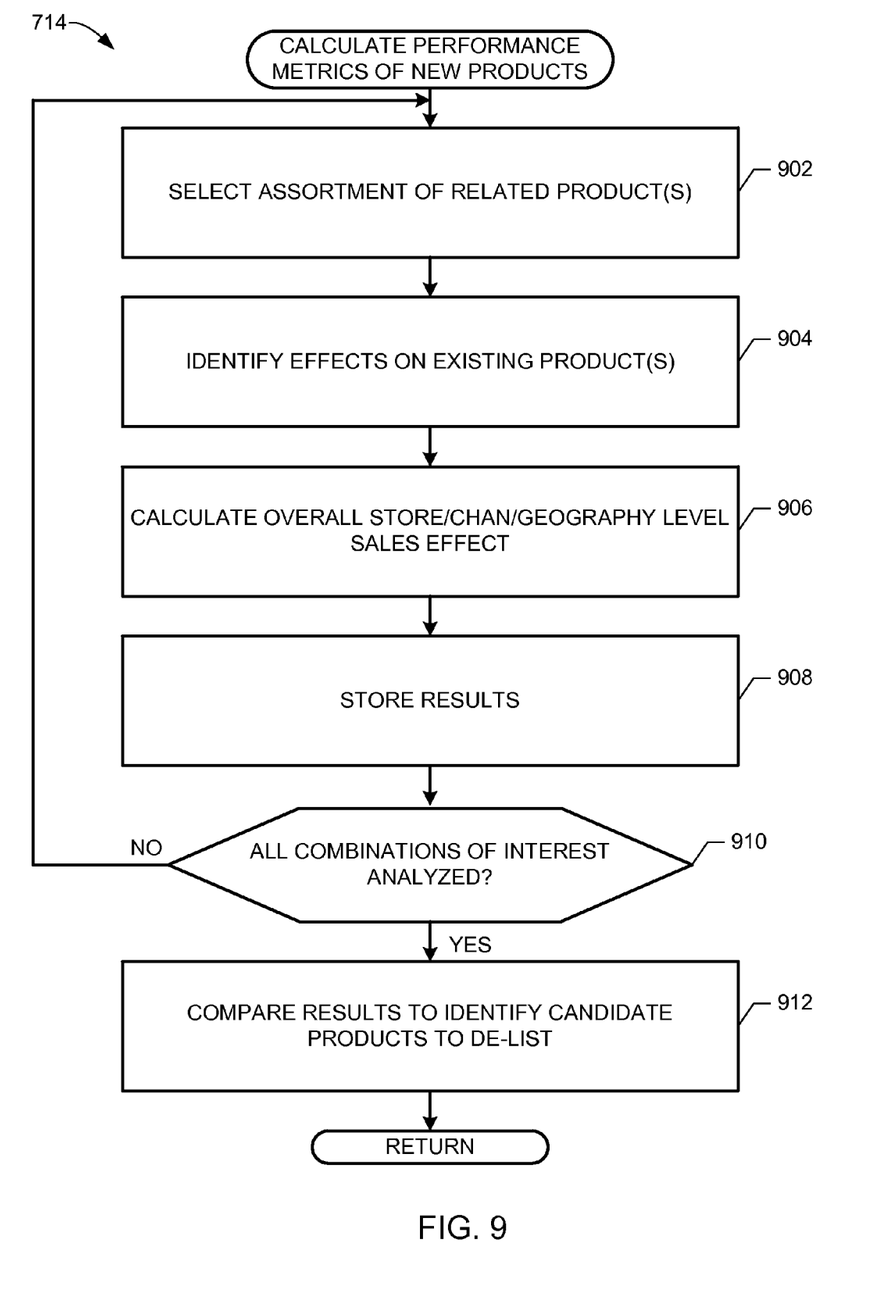

Flowcharts representative of example machine readable instructions for implementing the system 300 of FIGS. 3 and 4 are shown in FIGS. 7-9. In these examples, the machine readable instructions comprise a program for execution by a processor such as the processor 1012 shown in the example computer 1000 discussed below in connection with FIG. 10. The program may be embodied in software stored on a tangible computer readable medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 7-9, many other methods of implementing the example system 300 may alternatively be used. For example, the order of execution of the blocks may be changed, and/or some of the blocks described may be changed, eliminated, or combined.

As mentioned above, the example processes of FIGS. 7-9 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 7-9 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The program 700 of FIG. 7 begins at block 702 where the example new product manager 310 receives and/or otherwise retrieves the sales estimate information associated with a specified channel (e.g., number of unit sales in grocery channel, number of unit sales in pharmacy channel, etc.) 314, the distribution information 316 (e.g., 50% distribution for the identified channel) and/or the hierarchy information 318. As described above, while a new product for a region or channel of interest does not have associated historical sales and distribution data associated with it for that region or channel, information from a user of the example system 300 may provide estimates of expected and/or targeted sales and distribution goals for the new product. To help constrain the received estimate information with a degree of confidence, such received distribution information 316 and/or hierarchy information 318 is used by the example tree manager 402 to identify one or more candidate attribute tree(s) (block 704). The example market intelligence database 308 includes, in part, candidate attribute trees generated by the example tree manager 402 over time for exhibited sales and distribution behavior of existing market products. Example attribute trees include, but are not limited to, one or more hierarchical arrangements of categories specific to one or more geographies. Example attribute trees may additionally or alternatively include hierarchical information related to one or more particular channels for one or more geographies.

Generally speaking, an attribute tree may have different hierarchical arrangements based on the geography and/or channel with which it is associated. For example, in some geographies a category has an established set of competitors that compete for shelf space. In other geographies, a particular category may include a substantial sub-category preference (e.g., deep-dish pizza), while still other geographies include relatively few manufacturers for such sub-categories based on observed sales data. After selecting a candidate attribute tree based on the received distribution 316 and product hierarchy information 318, the example tree manager 402 tailors the candidate tree to include the new product within one or more of its branches (block 706). In some examples, a manufacturer of the new product identifies (a) a spatial location within the candidate tree where the new product is believed to be most similar to other products, (b) other sub-categories and/or (c) marketing channel(s).

As described above, because some products have different influences from geography to geography, from channel to channel, and/or from category to category, the example proximity weighting engine 406 establishes one or more impact parameters associated with the new product (block 708). In the event that the modified attribute tree indicates that a channel (e.g., grocery store, pharmacy, specialty store, etc.) associated with the geography of interest is likely to be an influential component of the new product distribution, an impact parameter may be weighted accordingly. For example, if the new product is related to edamame and the geography of interest includes a substantial Japanese culture, then the impact parameter associated with a specialty store channel may be weighted higher in view of a density of grocery stores that provide Japanese products. On the other hand, if the new product of interest is a thin-crust pizza, then the impact parameter may not be weighted as heavily based on a historically homogeneous level of sales in grocery channels from one geography to another.

In other examples, a new product may elicit a greater influence on a category, thereby causing the proximity weighting engine 406 to calculate an impact parameter having a greater weight. For example, while an overall pizza category may not exhibit a substantial channel influence from one geography to the next, the pizza category may differ substantially in view of products within sub-categories. Deep-dish pizza, for example, has a greater category influence in some geographic markets than in others, thereby warranting a corresponding impact parameter weight assigned by the proximity weighting engine 406.

The example ratio engine 408 of FIG. 4 uses the one or more impact parameters to calculate where sales are likely to manifest in the market and the distribution of the new products within the geography (block 710). For example, if 10,000 units of the new product are estimated to be sold in a grocery store channel, then the example ratio engine 408 identifies how many of those 10,000 units will actually sell in the target geography of interest. As described above, the ratio engine 408 of the illustrated example employs example Equations 1 and/or 2 to establish a category ratio and a channel ratio in view of received sales estimate information 314, received distribution information 316, information from the historical market intelligence database 308, and the impact parameter(s) to calculate an allocation of sales, or an allocation of distribution over one or more geographies of interest.

While the calculated allocation of sales and/or allocation of distribution (block 710) provides insight into the general sales effects from a channel of interest in a geography of interest, the example relationship matrix generator 306 further tailors a candidate relationship matrix to allow more granular forecasting of how the new product of interest will likely affect sibling products (block 712). As described in further detail below, a modified relationship matrix, such as the example modified relationship matrix 600 of FIG. 6, may be tailored and used with a model (e.g., the Assortman Optimizer® by Nielsen®) to calculate performance metrics of the new product (block 714). Performance metrics may include, but are not limited to, a proportional spread of volume of the new product in the geography of interest and/or a proportional distribution of the new product in the geography of interest.

The program 712 of FIG. 8 illustrates further detail related to building product relationships for each geography of interest (block 712) described in FIG. 7. In the illustrated example of FIG. 8, the program 712 begins at block 802 where the relationship matrix generator 306 identifies one or more candidate relationship matrices based on the geography of interest. As described above, each geography may have a different assortment of sibling products based on, in part, the presence of certain competitors. Sibling products in the candidate matrix selected for the geography of interest are identified by the example matrix modifier 404 that have a match to products within the modified attribute tree (block 804). A new column and row are inserted to the relationship matrix at the identified locations having matching products (block 806). The new column and row correspond to the new product of interest. Cell coefficients for the cells associated with the new column and row are calculated by the example proximity weighting engine 406 and/or the example matrix modifier 404 based on the cell coefficients of the sibling products (block 808). As described above, the new cell coefficients may be generated in any manner, such as, but not limited to a mathematical average of the sibling cells. The new cell coefficients now allow one or more models to be applied that calculate a relative effect of the new product on the sibling products.

Turning to FIG. 9, the program 714 of FIG. 9 illustrates further detail related to calculating performance metrics of new products described in FIG. 7. In the illustrated example of FIG. 9, the program 714 begins at block 902 where the new product manager 310 selects an assortment of product(s) related to the new product of interest. As described above, the example modified relationship matrix 600 includes a row/column associated with the new product of interest and each cell of the matrix 600 includes coefficients indicative of product shifting effects (proportional volume shifting effects). As each product has a measurable effect on every other product in the example matrix 600, different assortments of products in a store (e.g., on a shelf in an aisle) impose different effects on each other. Using the allocation of sales (or an allocation of distribution) calculated by the example ratio engine 408, the effects on existing products may be identified in terms of volume sold in the geography of interest (block 904). Additionally, an aggregate number of stores, chains and/or other channel aspect may be calculated to determine an overall sales effect (block 906).

Results may be stored in a memory (block 908), such as in the example market intelligence database 308 of FIG. 3, and another combination of product assortment may be considered (block 910). When any number of product assortment(s) combinations have been analyzed (block 910), the results may be compared to identify which product(s) are candidates for modification (e.g., a de-listing candidate) (block 912). For example, one or more analyses may indicate that a first product frequently illustrates poor performance when placed on a shelf proximate to the new product. The one or more analyses may alternatively conclude that, despite the poor performance of the first product, an overall store sales increase for the category and/or channel of interest increases in the aggregate, thereby confirming that the first product is not a candidate for modification (e.g., de-listing).

Figure 10:
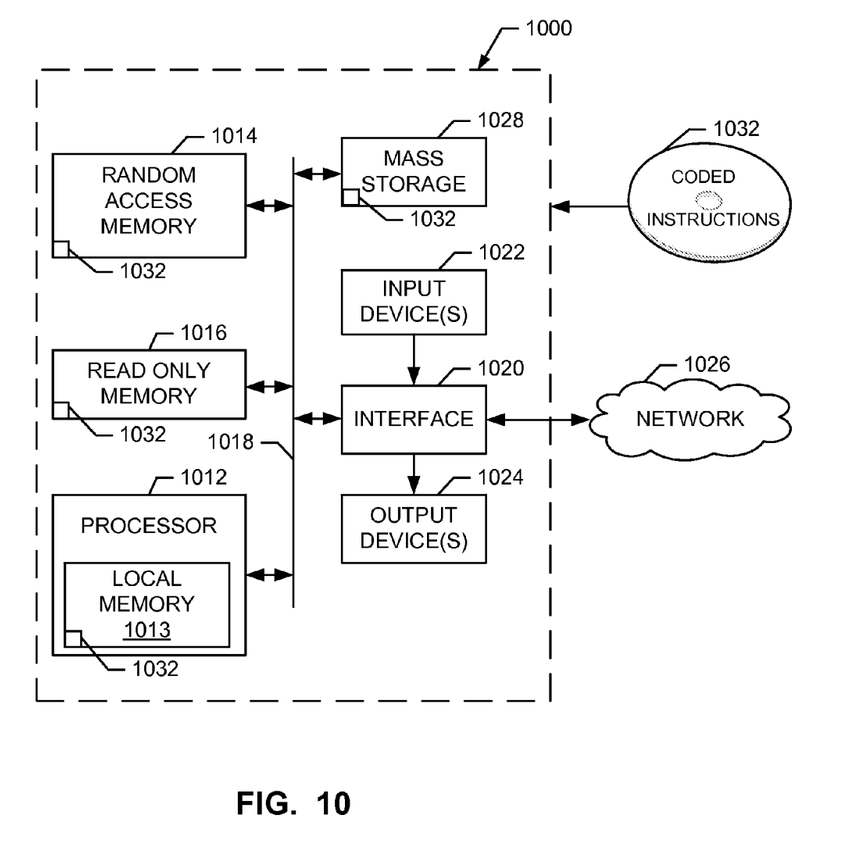
FIG. 10 is a schematic illustration of an example processor platform that may execute the instructions of FIGS. 7-9 to implement the example systems and apparatus of FIGS. 3 and 4.

FIG. 10 is a block diagram of an example computer 1000 capable of executing the instructions of FIGS. 7, 8 and/or 9 to implement the example product information database 302, the example channel information database 304, the example relationship matrix generator 306, the example market intelligence database 308, the example new product manager 310, the example tree manager 402, the example matrix modifier 404, the example proximity weighting engine 406 and/or the example ratio engine 408 of FIGS. 3 and 4. The computer 1000 can be, for example, a server, a personal computer, an Internet appliance, or any other type of computing device.

The system 1000 of the instant example includes a processor 1012. For example, the processor 1012 can be implemented by one or more microprocessors or controllers from any desired family or manufacturer.

The processor 1012 includes a local memory 1013 (e.g., a cache) and is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The computer 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device such as a modem or network interface card to facilitate exchange of data with external computers via a network 1026 (e.g., an Ethernet connection, a digital subscriber line (DSL), a telephone line, coaxial cable, a cellular telephone system, etc.).

The computer 1000 also includes one or more mass storage devices 1028 for storing software and data. Examples of such mass storage devices 1028 include floppy disk drives, hard drive disks, compact disk drives and digital versatile disk (DVD) drives. The mass storage device 1028 may implement the example product information database 302, the example channel information database 304 and/or the example market intelligence database 308.

The coded instructions 1032 of FIGS. 7-9 may be stored in the mass storage device 1028, in the volatile memory 1014, in the non-volatile memory 1016, and/or on a removable storage medium such as a CD or DVD.

From the foregoing, it will be appreciated that the above disclosed systems, methods, apparatus and articles of manufacture facilitate prediction of new product performance metrics within one or more geographies and/or channels of interest when, for example, no prior historical sales data is available for the new product in the corresponding geography or channel.

Although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to predict performance metrics of a new product, comprising:
   identifying, with a programmed processor, a segment location of a product hierarchy tree based on a projected distribution measure for the new product;
   retrieving, with the programmed processor, a relationship matrix associated with the segment location of the product hierarchy tree, the relationship matrix comprising available product performance coefficients and attribute information;

calculating, using the programmed processor, an impact parameter based on a spatial location within the relationship matrix, the spatial location based on the attribute information;

calculating the performance metrics for the new product for first and second assortments of related products on a store shelf, the first and second assortments associated with first and second proportional volume shifting effects, respectively, the performance metric calculated based on the impact parameter and a sum of (a) a ratio of category sales in a target geography and overall category sales in a sales channel associated with the new product, and (b) a ratio of channel sales in the target geography and overall channel sales in the sales channel associated with the new product; and selecting a candidate product to de-list based on sales effects with the first and second assortment of products on the store shelf.

2. A method as described in claim 1, further comprising identifying a plurality of product hierarchy trees related to at least one of a market channel or a market category associated with the new product.

3. A method as described in claim 1, further comprising retrieving a second relationship matrix associated with the projected distribution measure.

4. A method as described in claim 3, wherein the projected distribution measure includes a geographic indicator of at least one of a category or a channel associated with the new product.

5. A method as described in claim 4, further comprising identifying products in the relationship matrix that match sibling products in the product hierarchy tree.

6. A method as described in claim 5, further comprising adding a row and column associated with the new product to the relationship matrix adjacent to the matched sibling products.

7. A method as described in claim 6, further comprising calculating cell coefficient values for a plurality of cells in the row and column associated with the new product based on the matched sibling products.

8. A method as described in claim 1, further comprising tailoring the relationship matrix based on geographic attributes associated with a geography of interest.

9. A method as described in claim 1, further comprising de-listing the candidate related product when overall category sales for a store decrease and sales of the candidate related product decrease.

10. A method as described in claim 1, further comprising refraining from de-listing the candidate related product when sales of the candidate related product decrease while overall category sales for a store increase.

11. An apparatus to predict performance metrics of a new product, comprising:

a tree manager to select a product hierarchy tree based on a distribution measure for a new product, and to identify a segment location of the product hierarchy tree based on the distribution measure for the new product;

a matrix modifier to retrieve a relationship matrix associated with the segment location of the product hierarchy tree, the relationship matrix comprising available product performance coefficients and attribute information, the matrix modifier to identify a spatial location for the new product in the relationship matrix based on the attribute information; and a proximity weighting engine to calculate an impact parameter based on the spatial location within the relationship matrix, and to calculate the performance metric for the new product for a first and second assortment of related products on a store shelf, the first and second assortments to be associated with first and second proportional volume shifting effects, respectively, the performance metric calculated based on the impact parameter and a sum of (a) a ratio of category sales in a target geography and overall category sales in a sales channel associated with the new product, and (b) a ratio of channel sales in the target geography and overall channel sales in the sales channel associated with the new product; and a new product manager to select a candidate product to de-list based on a sales effect with the first and second assortment of products on the store shelf; and wherein the tree manager, the matrix modifier, the proximity weighting engine and the new product manager comprising a logic circuit.

12. An apparatus as described in claim 11, wherein the tree manager is to select the distribution measure based on a channel and a category.

13. A tangible machine readable storage device or storage disk comprising machine-accessible instructions, that, when executed, cause a machine to, at least:

identify a segment location of a product hierarchy tree based on a projected distribution measure for the new product;

retrieve a relationship matrix associated with the segment location of the product hierarchy tree, the relationship matrix comprising available product performance coefficients and attribute information;

calculate an impact parameter based on a spatial location within the relationship matrix, the spatial location based on the attribute information;

calculate performance metrics for the new product for a first and second assortment of related products on a store shelf, the first and second assortments associated with first and second proportional volume shifting effects, respectively, the performance metrics calculated based on the impact parameter and a sum of (a) a ratio of category sales in a target geography and overall category sales in a sales channel associated with the new product, and (b) a ratio of channel sales in the target geography and overall channel sales in the sales channel associated with the new product; and select a candidate product to de-list based on sales effects with the first and second assortment of products on the store shelf.

14. A tangible storage device or storage disk as described in claim 13, wherein the machine-accessible instructions, when executed, cause the machine to identify the projected distribution measure is indicative of a channel and a category.

15. A tangible storage device or storage disk as described in claim 13, wherein the machine-accessible instructions, when executed, cause the machine to receive a candidate segment location in response to identifying the segment location of the product hierarchy tree.

16. A tangible storage device or storage disk as described in claim 15, wherein the machine-accessible instructions, when executed, cause the machine to select the candidate segment location based on a product similarity input from a user.

17. A tangible storage device or storage disk as described in claim 13, wherein the machine-accessible instructions, when executed, cause the machine to retrieve a second relationship matrix associated with the projected distribution measure.

18. A tangible storage device or storage disk as described in claim 17, wherein the machine-accessible instructions, when executed, cause the machine to identify at least one of a category or a channel associated with the new product.

19. A tangible storage device or storage disk as described in claim 18, wherein the machine-accessible instructions, when executed, cause the machine to identify products in the relationship matrix that match sibling products in the product hierarchy tree.

20. A tangible storage device or storage disk as described in claim 19, wherein the machine-accessible instructions, when executed, cause the machine to add a row and column associated with the new product to the relationship matrix adjacent to the matched sibling products.

21. A tangible storage device or storage disk as described in claim 20, wherein the machine-accessible instructions, when executed, cause the machine to calculate cell coefficient values for a plurality of cells in the row and column associated with the new product based on the matched sibling products.

* * * * *